(12) United States Patent
Zoldi et al.

(10) Patent No.: US 9,774,681 B2
(45) Date of Patent: Sep. 26, 2017

(54) CLOUD PROCESS FOR RAPID DATA INVESTIGATION AND DATA INTEGRITY ANALYSIS

(71) Applicant: FAIR ISAAC CORPORATION, San Jose, CA (US)

(72) Inventors: Scott M. Zoldi, San Diego, CA (US); Joseph F. Murray, San Diego, CA (US); Jeffrey D. Carlson, San Diego, CA (US)

(*) Notice: Subject to any disclaimer, the term of this patent is extended or adjusted under 35 U.S.C. 154(b) by 249 days.

(21) Appl. No.: 14/506,543

(22) Filed: Oct. 3, 2014

(65) Prior Publication Data

US 2016/0100009 A1 Apr. 7, 2016

(51) Int. Cl.
  *G06F 15/167* (2006.01)
  *H04L 29/08* (2006.01)
  *H04L 12/26* (2006.01)

(52) U.S. Cl.
  CPC ........ *H04L 67/1097* (2013.01); *H04L 43/045* (2013.01)

(58) Field of Classification Search
  CPC .................... H04L 67/1097; H04L 43/045
  USPC ................... 709/213, 230, 212, 214
  See application file for complete search history.

(56) References Cited

U.S. PATENT DOCUMENTS

| | | | |
|---|---|---|---|
| 7,050,932 B2 | 5/2006 | Selby et al. | |
| 7,287,252 B2* | 10/2007 | Bussiere | G06F 11/3495 709/217 |
| 7,739,614 B1* | 6/2010 | Hackworth | G06F 11/3495 715/771 |
| 7,933,762 B2 | 4/2011 | Pinto et al. | |
| 8,494,798 B2 | 7/2013 | Kettaneh et al. | |
| 9,054,942 B1* | 6/2015 | De Temmerman | H04L 43/045 |
| 2003/0115195 A1* | 6/2003 | Fogel | G06F 19/327 |
| 2004/0073596 A1* | 4/2004 | Kloninger | H04L 12/2602 709/200 |
| 2007/0053428 A1* | 3/2007 | Saleem | H04N 19/0009 375/240 |
| 2010/0329247 A1* | 12/2010 | Kennedy | H04B 1/7163 370/389 |
| 2012/0005359 A1* | 1/2012 | Seago | G06F 9/5044 709/230 |
| 2012/0239681 A1* | 9/2012 | Zhang | G06F 17/30486 707/769 |
| 2013/0152057 A1 | 6/2013 | Ke et al. | |

(Continued)

*Primary Examiner* — Thu Ha Nguyen
(74) *Attorney, Agent, or Firm* — Mintz Levin Cohn Ferris Glovsky and Popeo, P.C.

(57) ABSTRACT

A system and method for rapid data investigation and data integrity analysis is disclosed. A data set is received by a server computer from one or more client computers connected with the server computer via a communications network, and the data set is stored in a distributed storage memory. One or more analytical processes are executed on the data set from the distributed storage memory to generate statistics based on each of the analytical processes, and the statistics are stored in a random access memory, the random access memory being accessible by one or more compute nodes, which generate a graphical representation of at least some statistics stored in the random access memory. The graphical representation of at least some statistics is then formatted for transmission to and display by the one or more client computers.

14 Claims, 11 Drawing Sheets

(56) References Cited

U.S. PATENT DOCUMENTS

| | | | |
|---|---|---|---|
| 2013/0262559 A1* | 10/2013 | Neerings | G06Q 30/02 709/203 |
| 2013/0268656 A1* | 10/2013 | Bott | H04W 4/16 709/224 |
| 2014/0047107 A1* | 2/2014 | Maturana | H04L 43/04 709/224 |
| 2014/0129936 A1 | 5/2014 | Richards et al. | |
| 2014/0156789 A1* | 6/2014 | Kolesov | H04L 67/1002 709/217 |
| 2014/0280142 A1* | 9/2014 | Wasson | G06F 17/30539 707/737 |
| 2015/0180920 A1* | 6/2015 | Hunter | H04L 67/025 709/203 |
| 2016/0021169 A1* | 1/2016 | Chan | H04L 67/10 709/217 |
| 2016/0149763 A1* | 5/2016 | Ingram | H04L 41/0823 709/224 |
| 2017/0034018 A1* | 2/2017 | Parandehgheibi | H04L 63/1425 |

\* cited by examiner

FICO Crunch

Create Report | View Reports | Manage Files | Logoff

Initial Setup
Format File
Analysis Configuration

Format File Edit
DBTRAN24.xml

Delimiter: Fixed Width

[Add New] [Save] [Save As]

| Field Name | Description | Position | | |
|---|---|---|---|---|
| recordCreationDate | Format: yyyymmdd<br>Date that this record was created. Time zone must be GMT. | 46-53 | ✏️ | 🗑️ |
| recordCreationTime | Format: hhmmss<br>Time that this record was created. Time zone must be GMT. | 54-59 | ✏️ | 🗑️ |
| recordCreationMilliseconds | Format: sss<br>Milliseconds portion of the time that this record was created. | 60-62 | ✏️ | 🗑️ |
| gmtOffset | Specifies the Greenwich Mean Time (GMT) offset associated with all date-time fields in the record body (positions 161 onward). Format is (-)nn.nn, where the digits to the right of the decimal point represent decimal fractions of an hour. For example, a GMT offset of 5 hours and 45 minutes (Nepal) is expressed as 5.75. Note that gmtOffset changes during Daylight Saving Time if Daylight Saving Time is observed in the date-time fields in the record body. | 63-68 | ✏️ | 🗑️ |
| customerIdFromHeader | Customer Identifier. Financial institution's unique identifier for the customer associated with this transaction. | 69-88 | ✏️ | 🗑️ |

| Merchant Category (MCC) | Likelihood of fraud event (%) |
|---|---|
| 4211 | 0.01 |
| 4321 | 0.20 |
| 4421 | 0.05 |
| 5432 | 0.01 |
| 5981 | 0.19 |
| 5911 | 0.22 |
| 5932 | 0.01 |
| 6011 | 0.06 |
| 7002 | 0.07 |

| Merchant Category (MCC) Grouping | Average Likelihood of fraud event (%) |
|---|---|
| MCC_group001 | 0.01 |
| MCC_group002 | 0.06 |
| MCC_group003 | 0.20 |

B)

| Merchant Category (MCC) Grouping | entryMode | | |
|---|---|---|---|
| | Swiped | Chip-and-pin | E-commerce |
| MCC_group001 | 5000 | 9000 | 6000 |
| MCC_group002 | 8000 | 2000 | 3000 |
| MCC_group003 | 200 | 50 | 1200 |

| MCC_group3 | entryMode | | |
|---|---|---|---|
| | Swiped | Chip-and-pin | E-commerce |
| 4321 | 100 | 10 | 200 |
| 5981 | 50 | 40 | 300 |
| 5911 | 50 | 0 | 700 |

FIG. 10

FICO Crunch

Create Report  View Reports  Manage Files

Customize Analysis

Initial Setup

Format File

Analysis Configuration

Select Field ▼   authDecisionCode

Column Number   313-313

Description   Authorization Decision Code:
A = Approve
B = Partial approval (a portion of the funds is approved)
D = Decline
I = Approve with positive ID
P = Pick up card
R = Refer
Blank = Unknown/other ☐ Use substring of field Select Analysis Type   Plots ▼

Plot Type   Line Chart (percentage ▼

X-Axis Field   Select Field ▼   transactionDate
☐ Use substring of field

☐ Filter by additional field

[Done] [Cancel]

FIG. 12

CLOUD PROCESS FOR RAPID DATA INVESTIGATION AND DATA INTEGRITY ANALYSIS

TECHNICAL FIELD

The subject matter described herein relates to data processing, and more particularly to a cloud process for rapid data investigation and data integrity analysis.

BACKGROUND

High quality data is critical for the success of predictive analytics both in the development of analytic models and their successful deployment and production use. Data understanding is the first step in development of predictive analytic models, and is critical to their success. This process can be time-consuming and can take longer than actual model development or software deployment of the model.

For analytic model development, data understanding involves discovering which data elements and detailed relationships in values of those data elements have predictive power towards the desired analytic decision. Data elements must be correctly collected, target values must be validated, and subpopulations understood. It is important that a data scientist be able to quickly inspect data and perform additional analyses to look for patterns, anomalies and investigate data integrity. Even more important is that the system itself automatically determines patterns in the data not prescribed by the analytic scientist.

Given that data understanding and integrity is a key component of developing analytics, this stage is critical to the development of meaningful predictive analytics. Typical data sets include examples from many subpopulations, each of which may have very different characteristics. A first look at the statistics of a data element may reveal multi-modality or apparent anomalies, and will motivate further questions. Multivariate analysis can then reveal if the issues are specific to certain populations or segments. Other questions about the data include: "how have these data elements changed between this month and last", and in a data consortium, "how does one client's data differ from another?", "why is a particular subpopulation accelerating further way from another?", or "why is a population's behavior diverging from past historical behavior in a short span of time?", etc. The faster such questions can be asked and answered, the more insight the data scientist can gain to build high quality predictive models and avoid spurious or non-representative learning in models.

Understanding higher dimensional data is a challenging problem because it is computationally intensive and difficult to visualize more than three dimensions. Using a simple technique of binning data element ranges (Cartesian product of element values), many bins may be provided that have very few counts, and it is difficult to get stable estimates of distributions or outliers. For elements that have many possible bins, the number of bins required for multivariate binning becomes intractable. For example, three variables, each with 100 bins, would require 1 million bins for the multi-dimensional analysis, and likely most of those bins would not have enough values to provide statistically sound estimates.

SUMMARY

This document discloses a system and method, implemented as a cloud process, for rapid data investigation, detailed data insight, and data integrity analysis. The system is a multi-user system with capabilities for multiple simultaneous users to construct, view and comment on analyses and collaborate to find insight and construct features for predictive models. After model development, the system is used to ensure that when the predictive model is deployed, the data sent to the model meets strict adherence to data formats, as well as the space of behaviors seen in the development data. Users of models can be alerted by the system to incorrect data format or changes in distribution or behavior, and can then consider how to treat the model outcome given these data changes seen in production.

In one aspect, a method and system for executing a method are presented. The method is directed to rapid data investigation and data integrity analysis. The method includes receiving, by a server computer, a data set from one or more client computers connected with the server computer via a communications network, and storing, by the server computer, the data set in a distributed storage memory. The method further includes executing, by a set of compute nodes associated with the server, one or more analytical processes on the data set from the distributed storage memory to generate statistics based on each of the analytical processes, and storing the statistics in a random access memory associated with the server computer, the random access memory being accessible by at least one of the compute nodes. The method further includes generating, by the at least one of the compute nodes, a graphical representation of at least some statistics stored in the random access memory, and formatting, by the server computer, the graphical representation of at least some statistics for transmission to and display by the one or more client computers.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 5 and 6 illustrate screen-shots of a Data Format editing screen of a system in accordance with implementations of the current subject matter;

FIG. 7 is a flowchart of a method for rapid interactive data analysis consistent with implementations of the current subject matter;

FIG. 10 illustrates an example of multivariate Cartesian product analysis on categorical variables utilizing finer bins to locate details of anomalous and data integrity issues;

FIG. 12 illustrates a screen-shot of a web-app for customizing an analysis.

When practical, similar reference numbers denote similar structures, features, or elements.

DETAILED DESCRIPTION

Figure 1:
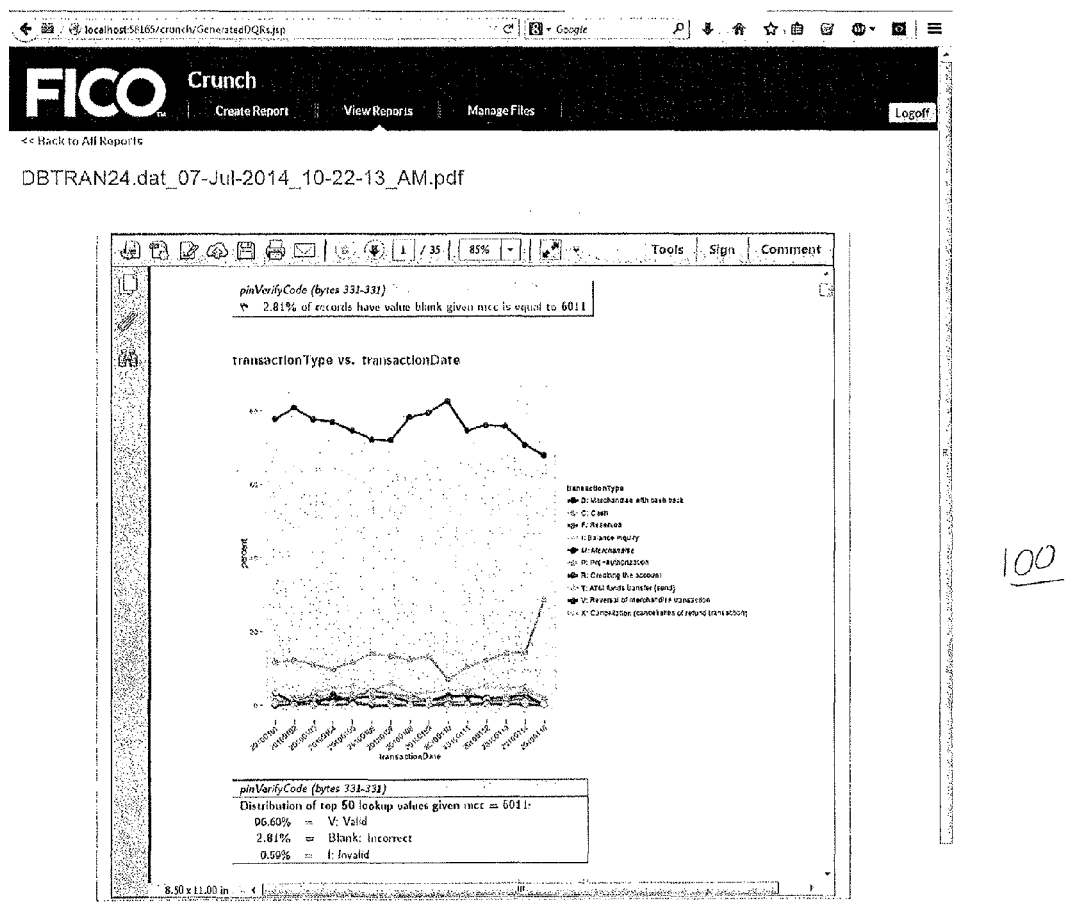
FIG. 1 illustrates a screen-shot of a data quality report, for the use case of implementing a predefined data format for an analytic model consistent with implementations of the current subject matter.

To address issues with currently available solutions, methods, systems, articles of manufacture, and the like consistent with one or more implementations of the current subject matter can, among other possible advantages, provide a cloud-based system and process for rapid data investigation, detailed data insight, and data integrity analysis.

In some implementations, a system and method is implemented as a cloud process, for rapid data investigation, detailed data insight, and data integrity analysis. The system is a multi-user system with capabilities for multiple simultaneous users to construct, view and comment on analyses and collaborate to find insight and construct features for predictive models. After model development, the system is used to ensure that when the predictive model is deployed, the data sent to the model meets strict adherence to data formats, as well as the space of behaviors seen in the development data. After being alerted by the system of incorrect data format or changes in distribution or behavior, users of models can then consider how to treat the model outcome given these data changes seen in production.

The system addresses the "ease of asking" with a high-level, easy-to-understand web front-end, and the "speed of answering" with a fully distributed parallel processing framework with automated detailed analysis looking for the patterns in data that a scientist needs to know to build models but may not be asking of the data themselves—particularly in new problem domains or in large data domains where deep analysis and data fidelity insight is critical.

Once the initial rounds of data understanding and validation are done, the system can be used in the next steps in analytic development such as feature engineering and performance evaluation. Feature engineering is the step of taking the raw data (often categorical or ordinal values) and constructing mathematical transformations to numeric features that are discriminative for the decision of interest. The system is configured to plot and evaluate these features, including relating to target values, comparing distributions over time, and filtering by other conditions. For example, when developing predictive models on financial transactions, the target values may include fraud or credit default.

For each target class such as fraud vs. non-fraud or credit-default vs. good-standing, the system is configured to investigate the distribution of input elements, derived features or subpopulations to determine the ranges of features and subpopulations which will allow for differentiation of target classes. Data elements and derived features with different distributions among the target populations may be valuable as inputs to predictive models. Conversely, if an element or feature is too closely aligned with the target, this may indicate a target leak which requires exclusion from a model. Failing to identify such leaks in data could lead to disastrous outcomes when a model is built without these removed in model training The system is configured to enable rapid investigation to inform such important analytic design choices.

After features and derived variables have been developed, they can be used in machine learning methods for predictive analytics. The system is further configured to analyze the model outputs from these analytic models as well. The outputs are often likelihoods of events (such as fraud or credit default) and the system is used to compare their distributions and investigate the differences between various models and among subpopulations.

In some implementations, the system supports data exploration in the cloud by storing the full data set within a distributed memory, such as random access memory (RAM), or variants thereof, of a cluster of computers, within a public or private cloud. Within-memory data analysis is very efficient, and allows interactive investigation. Since a cluster configuration is used, the size of the data available for rapid investigation is only limited by the total memory size of all the machines in the cluster. The underlying algorithms used by the system are highly-parallelizable, so that capacity and response times can be improved by adding additional servers and RAM to the cluster.

The final result from analytic model development is a trained and tested analytic model. The data investigation that occurs during model development helps inform the requirements on data quality which are needed to achieve acceptable performance from the model in production. These requirements include how each data element should be populated, including the data type (string, numeric, etc.), valid values for categorical values, allowable date ranges, and so on. In some implementations, the system executes a method that is typically run multiple times on the production data to ensure these requirements are met, both before model go-live and subsequently throughout production to catch any changes in the data, which naturally may happen due to real-world non-stationary distributions.

The analyses are displayed as tables, plots and "Red Flags" which provide an alert when data does not meet allowable standards. In this case, the types of analysis are known in advance, and are consolidated into a report type which can be quickly and easily run on any new data streams. Multivariate analysis can also be generated, such as conditioning on values in other fields, and intersections of record types between multiple data sources. The resulting statistics can be collected into a data quality report (DQR) and any major issues are automatically alerted to in the Red Flags which show incorrect or anomalous values of data elements. A method executed by the system before and during analytic deployment go-lives helps insure successful outcomes and highest quality predictive analytics.

In some implementations, the system runs in public and private clouds, so users of analytic models can directly access the system and create data investigation reports in one step, without transporting data between diverse teams and allowing for in-memory analysis of patterns during data exploration. Using cloud infrastructure, clients can perform all the steps of data validation and analytic model deployment themselves. Accordingly, in this case the system is a key step in cloud-based, self-provisioned model deployment.

In preferred implementations, the system is a multi-user system with capabilities for multiple simultaneous users to construct, view and comment on analyses and collaborate to find insight and construct features for predictive models. After model development, the system is used to ensure that when the predictive model is deployed, the data sent to the model meets strict adherence to data formats, as well as the space of behaviors seen in the development data. After being alerted by the system to incorrect data format or changes in distribution or behavior, users of models can then consider how to treat the model outcome given these data changes seen in production.

FIG. 1 is a representation of a data quality report generated by the system according to some implementations, for a use case of a predefined data format for an analytic model. The report includes a red flag report 102 indicating an error with a particular field ("pinVerifyCode"), and a plot 104 showing changes over time in a distribution for the field "transactionType." The data quality report further includes a distribution table 106 that shows the full distribution of the pinVerifyCode field with the invalid values.

Figure 2:
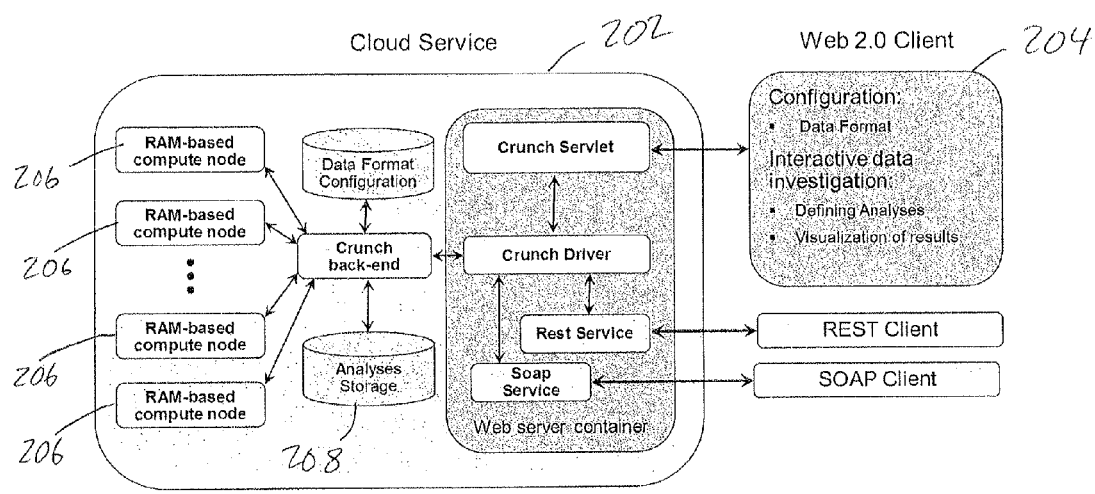
FIG. 2 is a diagram illustrating aspects of a system showing features consistent with implementations of the current subject matter.

As shown in FIG. 2, the preferred implementation of the system 200 includes a back-end cloud service 202, and a front-end web client 204. The cloud service includes distributed compute nodes 206, which can be implemented as random access memory (RAM) nodes or other type of computationally-efficient memory. The system 200 further includes data storage 208 and a web server 210. The web client 204 includes modules or applications for data formatting, specifying analyses and visualizing results.

Figures 6, 7:
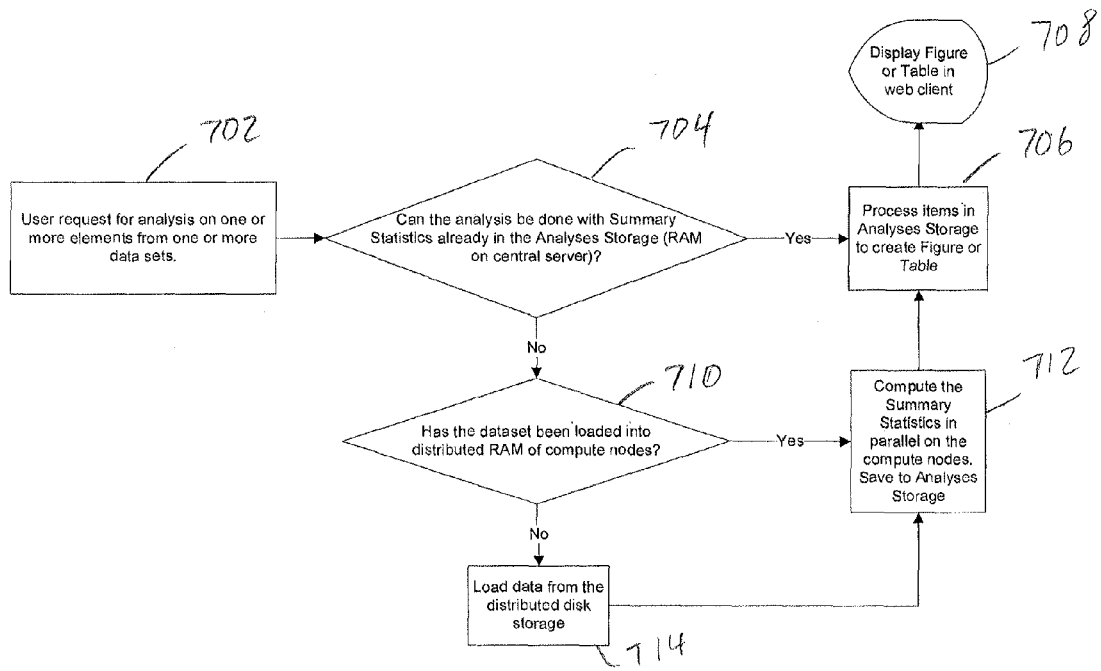

The system 200 executes a computer-implemented process for data investigation, which begins with the user inputting to the computer a description of a format of the data using an interactive data format interface (illustrated in FIGS. 5 and 6) on the web client 204. FIG. 5 shows a screen-shot of a Data Format editing screen. FIG. 6 shows another screen-shot of the Data Format editing screen where the details of each record are entered, such as field name, position, description and data type (e.g., date or numeric).

One of the first steps in using system is to define type of input data file (fixed-width, CSV, or other delimited) and the layout of the fields, including the field name, description, position in record and data type. Then, after selecting data formats and input files, the user inputs a selection of the one or more analyses to be performed by the computer. The analyses include statistical tables, derived variables, plots and red flags, each of which can operate on various data types such as categorical, numerical, date and time.

Figure 3:
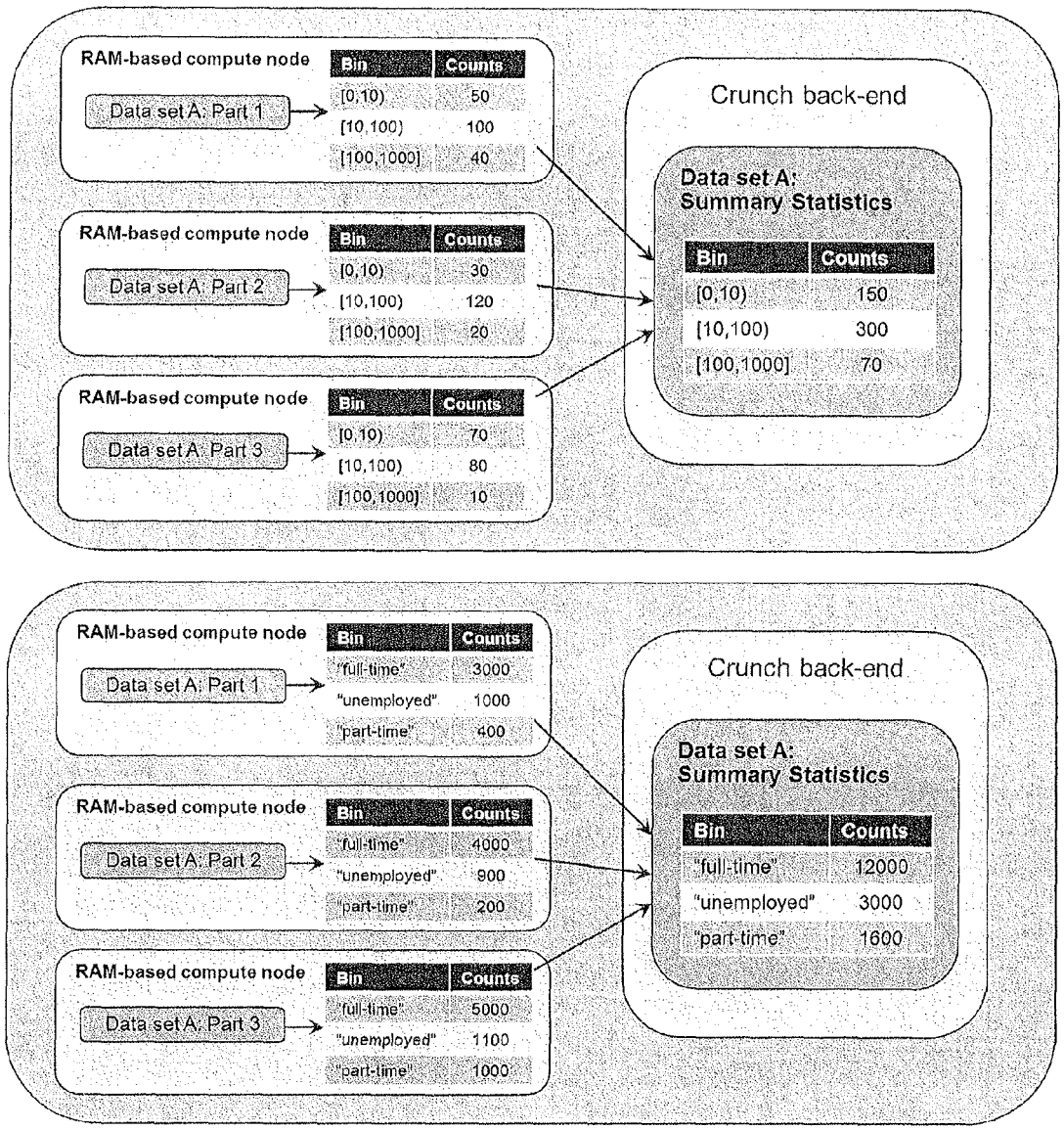
FIG. 3 illustrates an architecture for calculation of summary statistics. In this example, the summary statistics are for numerical binned values and for categorical values.

Efficient parallel processing is accomplished by multiple levels of RAM-based storage. To compute the analyses, the compute nodes 206 process the full data set using parallel processing, and create summary statistics. Summary statistics can include:
  Tables of frequencies of categorical values or binned numeric values
  Cumulative distribution tables
  Descriptive statistics (mean, medium, max, min, standard deviations)
  Derived variables, which are functions of one or more summary statistics and other derived variables. Some examples include:
    Functions of multiple values in a summary statistics table, such as the moving average over a particular date range.
    Ratios of derived variables, such as moving averages of different length time windows.
    Self-calibrating quantile estimates for efficient tracking of non-stationary distribution and outliers in various subpopulations and complex multivariate cuts of data.
  Multivariate outlier analysis based on clustering The system uses summary statistics that are relatively small compared with the full data set, and which can be stored within memory on a master server 210 to enable the system to investigate large amounts of data in depth. Once the summary statistics are generated, they are processed by the master server to generate figures and tables that can be viewed and manipulated by the user on a web client. FIG. 3 shows examples of calculating summary statistics for numerical (binned) data and categorical data. Each compute node finds the partial statistics of the data contained in its memory, and the back-end server 210 combines them into summary statistics which are representative over the full data set.

Figure 4:
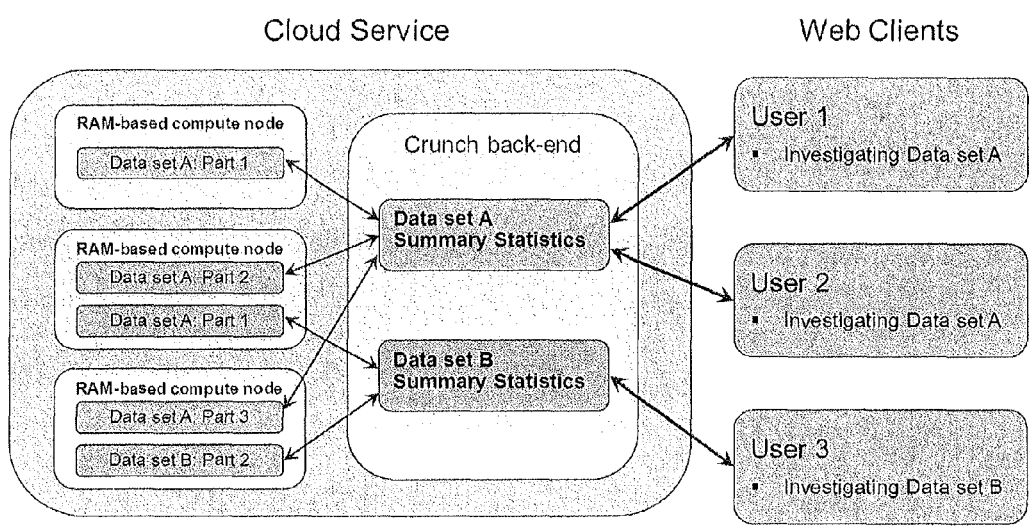
FIG. 4 is a diagram illustrating aspects of a multi-user architecture system showing features consistent with implementations of the current subject matter.

The system can handle cases of one or more users, and in particular where multiple users use the system to investigate the same data, as illustrated in FIG. 4. FIG. 4 illustrates an exemplary multi-user architecture, in which users 1 and 2 are both accessing data set A, which is only loaded into memory once. A single set of Summary Statistics is kept for each data set, offering quick viewing of previously computed analyses. When multiple users are accessing the same data set, the compute nodes 206 keep a single copy of that data set and summary statistics in memory. This conserves memory and increases speed when a user needs to investigate a data set which has already loaded into memory of the compute nodes 206.

For processing efficiency, the system executes logic that is configured to decide whether already computed summary statistics can be used. If a new analysis can be done with summary statistics already present in the analysis storage on the central server 210, the compute nodes 206 can conserve computation and communication overhead. If the analysis requires new summary statistics, those tasks can be distributed in parallel to the compute nodes 206. The compute nodes also have persistent (disk-backed) storage to preserve data which is not currently being investigated and to protect against data-loss.

FIG. 7 shows an overview of this logic, as represented by a method 700 for providing rapid interactive data analysis. At 702, the system receives a user request for analysis on one or more elements from one or more data sets. At 704, the system processes the user request to determine whether the analysis can be done with summary statistics already stored in a memory, for example, stored on the central server in a memory referred to herein as Analyses Storage. If yes, at 706 the system processes the items in the Analyses Storage to create a figure or a table from the analysis of the items, and at 708 the system generates the figure or table for display in a web client or other type of display.

If the analysis cannot be done with summary statistics already stored in a memory, at 710 the system conducts further processing to determine whether the dataset has been loaded into distributed memory of the compute nodes of the system. If yes, at 712 the system computes the summary statistics in parallel on the compute nodes, and the result is stored in the Analyses Storage, where the figure or table is created as at 706 and a representation is generated for display as at 708. If the dataset has not been loaded into distributed memory of the compute nodes of the system, then at 714 the system loads the data from the distributed disk storage, and the method 700 continues as at 712.

In addition to summary statistics and basic derived variables, the system utilizes highly efficient streaming self-calibrating outlier models that compute statistics on highly diverse and numerous subpopulations. This allows comparing subpopulations to each other, and to identify records which are outliers within their subpopulations. The streaming computation of quantiles is important to detect both diversity in distributions of subpopulations and temporal changes in distribution within subpopulation. At any given temporal point in the data, an outlier can be determined. These temporal changes and specific outliers can be used in predictive modeling to find pockets of correlation or patterns that can be utilized in features. The self-calibrating technology can also assist in identifying target leaks which need to be removed from the data before model development.

Figure 8:
FIG. 8 illustrates a screen-shot of a report where the self-calibrating outlier technology is used to find the extreme values ($95^{th}$ percentile) of a transaction amount for a sub-population of a number of zipcodes.

FIG. 8 shows an example of the extreme quantile distribution over time, in the case of transactionAmount for zipcode subpopulations.

FIG. 8 is a screen-shot of a report where the self-calibrating outlier technology is used to find the extreme values (95th percentile) of transactionAmount for the subpopulation of each zipcode. The overall population 99th percentile is shown on each graph (dashed green lines). The zipcode with the highest 95th percentile is noted in hashed red line (upper-right plot).

The system can conduct a number of different analyses, from basic to advanced. For each analysis type a description and an example use-case is given.

Frequencies of categorical or numeric values
Description: Calculates the counts and percentages of each value of categorical values or binned numeric values. The frequencies can be displayed as tables and plots, and be compared between different files. Filters can be applied to select records which meet certain criteria.
Exemplary Use case: Credit card transactions typically have fields such as "transactionType" to indicate Cash or Merchandise. The percentages of each transactionType are important to compare over different time periods and different populations.

Cumulative distributions
Description: Calculates the distribution of records which have values less than or equal to bin ranges.
Exemplary Use case: Outputs of predictive models are often scores. The distribution of these scores can be compared over different models or time ranges. Typically it is important to reduce variations in these distributions.

Data element validation.
Description: Data elements can be validated through "Red Flag" reports, which bring extra attention by appearing when values do not meet the specified criteria.
Categorical variable validation. Red flag reports can warn if a certain percentage of records have missing or invalid values.
Date and time validation. Red flag reports can warn if date and time formatting is incorrect and if it falls outside allowable ranges.
Numeric values fall within certain ranges. Limits can be set on minimums, maximums, medians, or more complicated distribution statistics, etc.
Exemplary Use case: When deploying a predictive analytic model into production, data validation is important to insure the model behaves as it was designed. If the allowable values for a categorical element are "C", "M", "B", and a production data feed only has values of "M", the Red Flag report would be created and inform the model user that data fixes are needed.

Descriptive statistics for numeric data
Description: Mean, median, min, max, quantiles
Exemplary Use case: For any numeric field, understanding of its basic statistics is required before applying more sophisticated analysis. For example, the mean purchase amount in December of one year can be compared against the previous year.

Functions of numeric data
Description. Functions can be applied to numeric values, and the results can be investigated using the systems' other types of numeric analyses. Particular functions include log, exp, power, sqrt, and weight of evidence. By "weight of evidence", it is meant the empirical calculation of the evidence for one of two mutually exclusive hypotheses $H\_1$, $H\_2$ (e.g., binary target values) within a binned range of an independent variable x [1]. The weight of evidence, $WE(k)$ for bin k is, $$WE(k)=\ln((p(x \in k|H\_1))/(p(x \in k|H\_2)))$$

Exemplary Use case: Many natural and man-mode processes have highly non-uniform distributions, and their structure is more apparent after applying functions such as log transformations. Weight of evidence is used in feature engineering to decide if a derived feature or input variable provides reasonable evidence for the modeled decision (hypothesis).

Intersection of values in multiple files
Description: Intersection analysis is used to determine which values of a key appear in multiple files. This is an important analysis when investigating data which has been extracted from a relational database (RDBMS) into multiple files. The system's algorithm for computing intersections is highly parallel and does not require inserting the data back into a database.

Exemplary Use case: Consider data on customers and their transactions. The transaction data (date of purchase, items, amounts, etc.) and the customer information (address, email, etc.) are often initially in different database systems and are extracted with different processes and cadences. The data scientist receives this information in two or more files each for the customer and transaction data. An important question is: "for how many transactions do we have the customer data?" An intersection analysis is computed to find the percentage of transactions which do not have customer records. If this intersection percentage is too low, the data may not be suitable for modeling and may require revisiting the extraction process. Intersection analysis can also be done on subsets of records through filters. For example, it can be found with the customer data those records which are small business and then ask "what is the intersection between authorizations that are only from small business customers?" If the intersection rate is too low for a critical customer segment, then modeling may not be feasible, even if the overall intersection rate is acceptable.

The analysis types above are essentially univariate (although most can be filtered conditionally on values of other data elements). However, most predictive analytics requires modeling interactions among multiple elements, and multivariate data investigation is important for this process. The system can execute processes to understand relations between multiple data elements and to estimate multivariate distributions. The system provides a more efficient multivariate analysis which can handle these cases (cluster divergence analysis).

Self-calibrating quantile estimation

Figure 9:
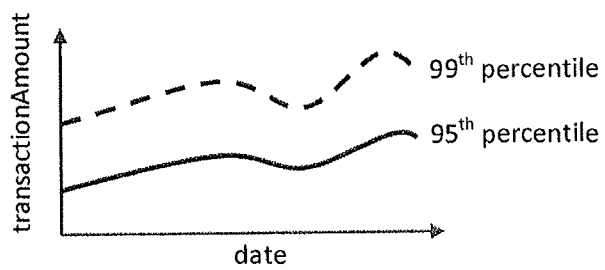
FIG. 9 illustrates efficient quantile estimation to track extreme values of a non-stationary distribution.

Description: Self-calibrating quantile estimation tracks quantiles of numeric elements (for example, extreme values: 95th %, 99th %, 5th %, 1st %, as well as mean) in time-series data (FIG. 9) or in exemplary subpopulations at a single time slot. FIG. 9 shows this efficient quantile estimation used to track extreme values of a non-stationary distribution, using a self-calibrating quantile estimation technology. This technology allows tracking of quantiles over time or mapping subpopulation distributions for comparison without explicitly storing the full distribution at each time step. This is more efficient in computation and storage than full calculation of the distribution, as well as more robust to variations in sample size over time. If the distributions were computed independently (for example, every day), for intervals with low-sample sizes, the extreme quantiles could be inaccurately estimated. In contrast, the self-calibrating technology keeps an online estimate of the quantiles of interest, which is faster than rolling-window or moving-average computations.

Exemplary Use case: Consider the case of looking for outliers in purchase amounts segmented by postal zip code. There are over 40,000 zip codes in the United States, which are expected to have differing and time-varying distributions. Self-calibrating estimation can be used to efficiently model extreme quantiles of purchase amount (such as 99%), and track these over time. A full distribution for each of the 40,000 zip codes is not necessary, saving computation and RAM. The quantile estimates can be used in a number of ways.

The purchase amount extreme quantiles can be compared with each other, to ask "what are the 50 zip codes with the highest 99th % amount?" The quantiles can be compared over time, to ask "which zip codes have had the largest change in the 99th % amount during this year or this week?" The quantile estimates can also be used to extract records which exceed the extreme values. The extracted records can be further analyzed, which are useful in deciding if these records should be used in predictive model training and whether certain subpopulations are anomalous and may be used to create predictive variables in model development, or need to investigate the data acquisition process.

Categorical Variables

Description: Cartesian product of data element values. This analysis enumerates all the combinations of one data element with another element. However, this is only practical when the number of values each element can take is limited, to prevent combinatorial explosion. When the number of categories is high, then groupings based on another variable for example a target value) are used to create a more manageable set of inputs to the Cartesian product. If an anomalous or interesting pattern is seen, the groupings can be interactively investigated through the web interface.

Exemplary Use case: For two categorical values, each of which can only take 5 values, a user may want the exact percentages of records which contain every possible combination of the values, which in this case would be 25 possibilities. FIG. 10 shows an example where a categorical variable is reduced to groupings based on the target (fraud transactions), which can then be tabulated against other variables (Cartesian product), and finally the relevant grouping expanded back to their original categories.

FIG. 10 illustrates an example of multivariate Cartesian product analysis on categorical variables. A) The variable Merchant Category Code (MCC) can take many thousands of values, and the Cartesian product of its values with another variable (such as entryMode) would be even larger. Before the Cartesian product is done, MCC is ranked and grouped using another variable (fraud status) into three groups in order of fraud likelihood. B) The Cartesian product can be done against the entryMode variable, which may reveal certain combinations for further exploration. In this case, the record count for E-commerce in MCC_group003 is an outlier, and the original MCC codes within group 3 can be examined in further detail (in this case, revealing that merchants with code 5911 have high-risk e-commerce transactions.)

Cluster Divergence Analysis

Description: Mixed categorical and numeric values. This analysis lets us understand how multivariate distributions are changing over time or based on other conditions such as customer segmentation. First, all the elements of interest are concatenated into a single vector, with categorical and ordinal values represented numerically, for example, converted to indicator (dummy) variables. Then, an unsupervised clustering algorithm is applied. Cluster centers are generated for each time period or variable condition of interest. The cluster centers can then be compared, to reveal any changes in distribution over time. If differences are found, the system reports which data elements are most responsible for the change in distribution.

Figure 11:
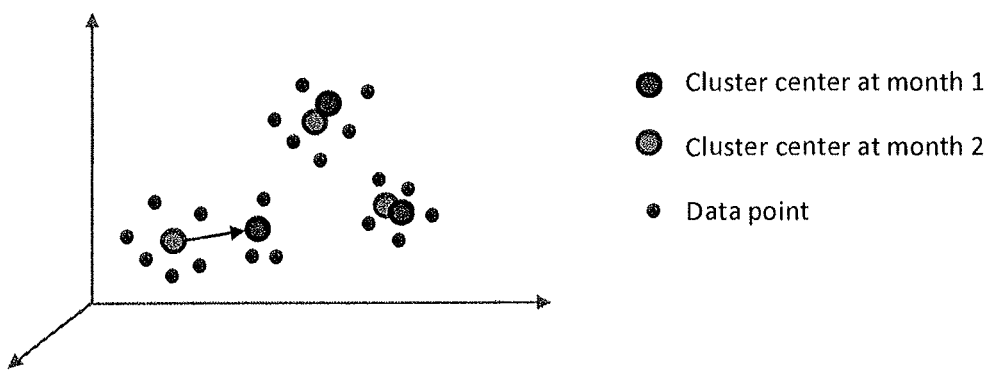
FIG. 11 illustrates cluster divergence analysis used to detect changes in distribution for high dimensional data.

Exemplary Use case: FIG. 11 presents an example of cluster divergence analysis to detect changes over time in high-dimensional data. For example, if 10 data elements are selected, a 10 dimensional space is generated, which is represented by 3 clusters for each of two time periods, month 1 and month 2. The differences in the cluster centers can be easily compared, and in this case, the cluster in the lower left has moved significantly, so the investigation shows that the distributions have changed from month 1 to 2. The system can also report which records fall into each cluster, allowing further analysis of the changing distribution. FIG. 11 is an example of how cluster divergence analysis is used to detect changes in distribution for high dimensional data. In this example, the clusters centers are computed separately for two months of data, shown in cross-stitched shading for month 1 and red for month 2. One of the clusters has moved substantially from month 1 to 2 (red arrow), which indicates this distribution has changed over time.

The configuration of each of these types of analysis is done through the web-app GUI. FIG. 12 shows the configuration of a plot over time of categorical values. FIG. 12 is a screen-shot of a web-app of the system for customizing an analysis. In this example, the analysis is a line chart (vs transactionDate) which will create separate lines for each of the values of the authDecisionCode data element.

Visualization and Collaboration. The system's analyses are presented to the user in figures, tables and Red Flags, which can quickly be explored and visualized. New analyses can be added, while existing analyses are preserved for quick review. Collaboration on data investigation is also a key feature of the system, as analytic development and deployment teams are often dispersed geographically. Since the system stores data and analyses in a public or private cloud, multiple users can view and contribute to the data investigation at the same time through their web clients without extensive data transfer. Role-based authorization allows certain users the rights to construct and modify analyses, while other are limited to view or comment on the process.

For conservation of memory on the compute nodes, the collaborative features can be optimized to allow multiple users to be working on the same copy of a RAM-based dataset, regardless of whether their analyses are shared and viewed simultaneously.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, by a server computer, a data set from one or more client computers connected with the server computer via a communications network;
storing, by the server computer, the data set in a distributed storage memory including a set of memory based compute nodes associated with the server, the dataset stored in parts across the set of memory based compute nodes;

executing, by the set of memory based compute nodes, one or more analytical processes on the data set from the distributed storage memory to generate summary statistics based on each of the analytical processes, each compute node finding partial statistics of a data part stored on the respective compute node, the partial statistics representative of a respective data part;

storing the summary statistics in a random access memory associated with the server computer, the random access memory being accessible by at least one of the compute nodes, the summary statistics being a combination of the partial statistics and representative of a full data set;

identifying, for pre-model building data understanding, outlier data by comparing subsets of data in the data set, the identified outlier data accessible to a predictive model;

generating, by the at least one of the compute nodes, a graphical representation of at least some summary statistics stored in the random access memory; and formatting, by the server computer, the graphical representation of at least some summary statistics for transmission to and display by the one or more client computers.

2. The method in accordance with claim 1, wherein the distributed storage memory comprises the random access memory available to multiple program threads running on multiple processors within a multi-processor (multi-core and/or multi-CPU) computer.

3. The method in accordance with claim 1, wherein the set of compute nodes includes two or more compute nodes that compute in parallel, and wherein the distributed storage memory is available on all of the compute nodes.

4. The method in accordance with claim 1, further comprising generating efficient statistical condensation of dimensionality of transaction data into efficient transaction statistical summary distribution arrays in the distributed storage memory.

5. The method in accordance with claim 1, further comprising generating, by at least one of the compute nodes, a set of variables, the set of variables being derived at least in part from the summary statistics stored in the random access memory.

6. The method in accordance with claim 1, further comprising providing pattern detection for differentiated candidate model feature creation during predictive model development.

7. The method in accordance with claim 1, further comprising automatically identifying anomalous or outlier behavior in data to efficiently investigate large numbers of data subpopulations.

8. The method in accordance with claim 1, further comprising identifying suspected data integrity issues in data subpopulations by collecting data integrity checks into a report type, the report type being run and repeatable for each data integrity issue identification.

9. The method in accordance with claim 1, further comprising interactively exploring high-dimensional data distributions, the high-dimensional data being grouped into one or more statistics distribution arrays allowing users to interactively explore detected data patterns of interest.

10. The method in accordance with claim 1, further comprising automatically detecting outliers and changes in distribution of high-dimensional data.

11. The method in accordance with claim 1, further comprising analyzing multiple data files to determine the rates of intersection and co-occurrence of features and patterns, within the full population and one or more subpopulations.

12. The method in accordance with claim 1, further comprising enabling access by multiple simultaneous users to investigate the same data sources via one or more statistical distribution arrays and derived variables that are stored in the distributed storage memory.

13. The method in accordance with claim 1, further comprising maintaining the dataset within the distributed storage memory for future accessing and processing to occur in response to interaction with the graphical representation of the at least some summary statistics.

14. The method in accordance with claim 13, further comprising:
  receiving a request for additional data analysis from the one or more client computers;
  determining whether the data set is present in the distributed storage memory; and
  computing additional summary statistics in parallel on the compute nodes, the compute nodes accessing the dataset from memory without accessing distributed disk storage.

* * * * *